United States Patent
Green et al.

(10) Patent No.: US 10,767,144 B2
(45) Date of Patent: Sep. 8, 2020

(54) SOAP REFORMING ASSEMBLY

(71) Applicants: Cheryl Green, Philadelphia, PA (US); Leonard Williams, Philadelphia, PA (US)

(72) Inventors: Cheryl Green, Philadelphia, PA (US); Leonard Williams, Philadelphia, PA (US)

(*) Notice: Subject to any disclaimer, the term of this patent is extended or adjusted under 35 U.S.C. 154(b) by 190 days.

(21) Appl. No.: 16/122,475

(22) Filed: Sep. 5, 2018

(65) Prior Publication Data
US 2020/0070386 A1    Mar. 5, 2020

(51) Int. Cl.
C11D 13/16    (2006.01)
C11D 13/30    (2006.01)
C11D 13/12    (2006.01)

(52) U.S. Cl.
CPC .............. C11D 13/16 (2013.01); C11D 13/12 (2013.01); *C11D 13/30* (2013.01)

(58) Field of Classification Search
CPC .......... C11D 13/16; C11D 13/12; C11D 13/30
See application file for complete search history.

(56) References Cited

U.S. PATENT DOCUMENTS

| | | | |
|---|---|---|---|
| 4,030,867 A * | 6/1977 | Everman | C11D 13/16 425/144 |
| 4,035,122 A | 7/1977 | Cavanaugh | |
| 4,781,564 A | 11/1988 | Cerrone | |
| 4,917,589 A | 4/1990 | Manderson | |
| 5,511,882 A | 4/1996 | Anwunah et al. | |
| 5,876,769 A | 3/1999 | Dowden | |
| D411,212 S | 6/1999 | Jones | |
| 8,529,239 B1 | 9/2013 | Black | |
| 9,765,290 B2 * | 9/2017 | Welcome | C11D 13/16 |
| 2009/0029891 A1 | 1/2009 | Callahan | |
| 2011/0127245 A1 | 6/2011 | Burrus | |

* cited by examiner

*Primary Examiner* — Joseph S Del Sole
*Assistant Examiner* — Jerzi H Moreno Hernandez

(57) ABSTRACT

A soap reforming assembly includes a housing and a soap collection unit that is coupled to the housing for collecting and transporting pieces of soap when the pieces of soap are dropped into the housing. A heating element is coupled to the housing and the heating element heats the soap collection unit to melt the soap pieces into a fluid soap. A forming unit is positioned within the housing for receiving the fluid soap from the soap collection unit when the heating element produces the fluid soap. The forming unit cools and forms the fluid soap into a bar for bathing. A drawer is slidably positioned in the housing and the drawer receives the bar of soap from the forming unit. The drawer is positionable in an open position having the drawer extending outwardly from the housing to dispense the bar of soap.

15 Claims, 7 Drawing Sheets

SOAP REFORMING ASSEMBLY

BACKGROUND OF THE INVENTION

(1) Field of the Invention

The disclosure and prior art relates to reforming devices and more particularly pertains to a new reforming device for recycling pieces of soap.

BRIEF SUMMARY OF THE INVENTION

An embodiment of the disclosure meets the needs presented above by generally comprising a housing and a soap collection unit that is coupled to the housing for collecting and transporting pieces of soap when the pieces of soap are dropped into the housing. A heating element is coupled to the housing and the heating element heats the soap collection unit to melt the soap pieces into a fluid soap. A forming unit is positioned within the housing for receiving the fluid soap from the soap collection unit when the heating element produces the fluid soap. The forming unit cools and forms the fluid soap into a bar for bathing. A drawer is slidably positioned in the housing and the drawer receives the bar of soap from the forming unit. The drawer is positionable in an open position having the drawer extending outwardly from the housing to dispense the bar of soap.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
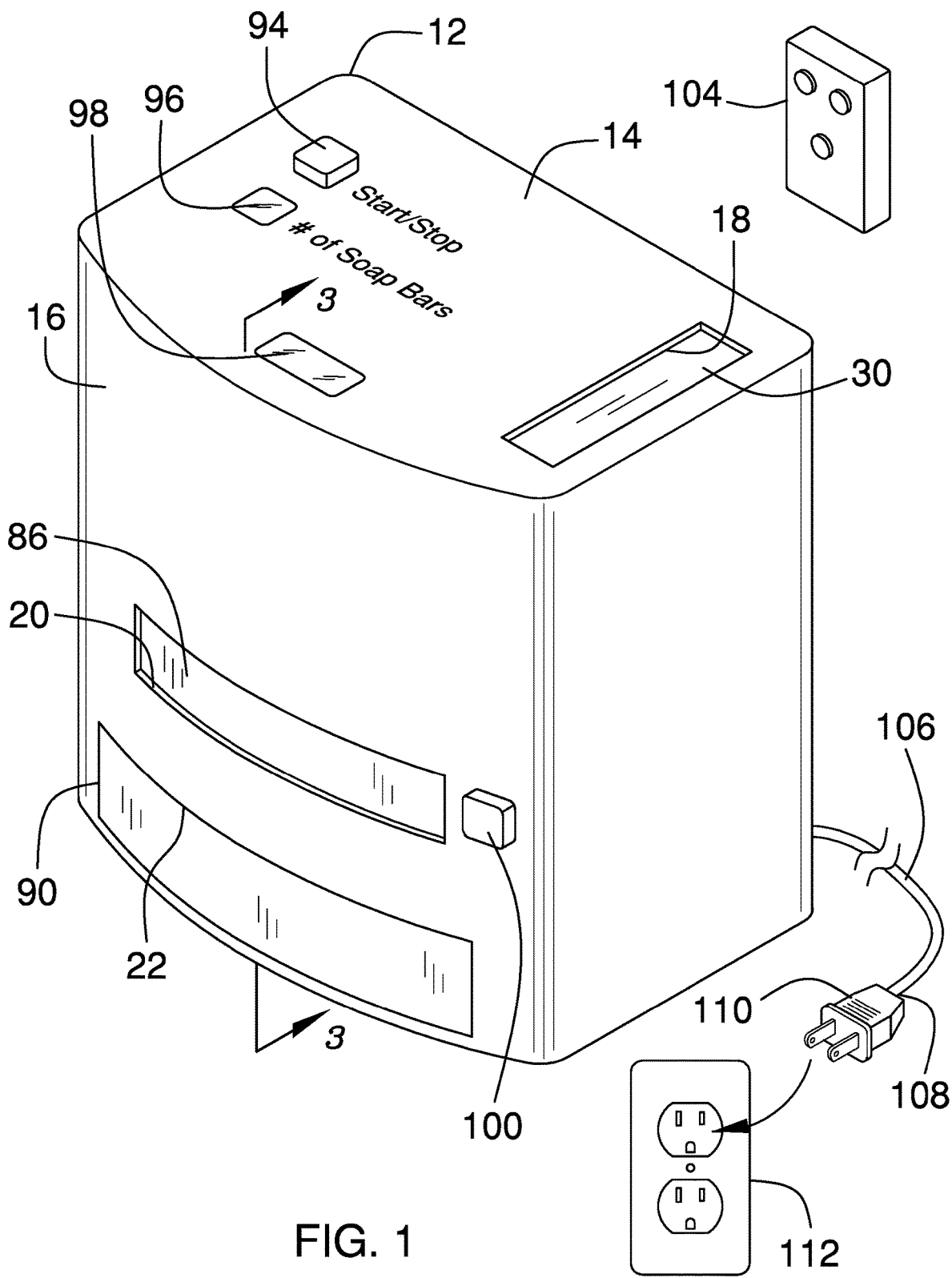
FIG. 1 is a perspective view of a soap reforming assembly according to an embodiment of the disclosure.
Figure 2:
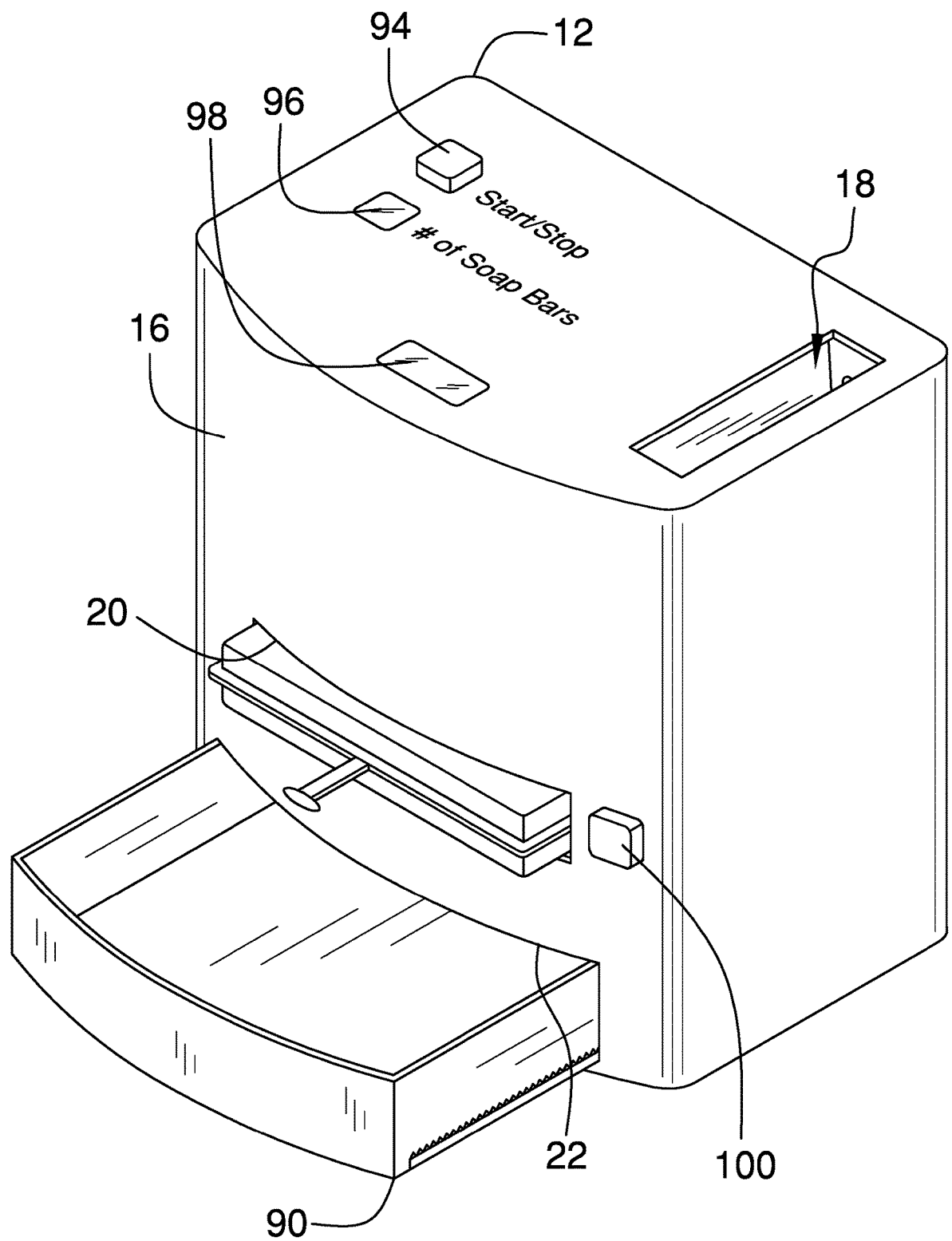
FIG. 2 is a front perspective view of an embodiment of the disclosure.
Figure 3:
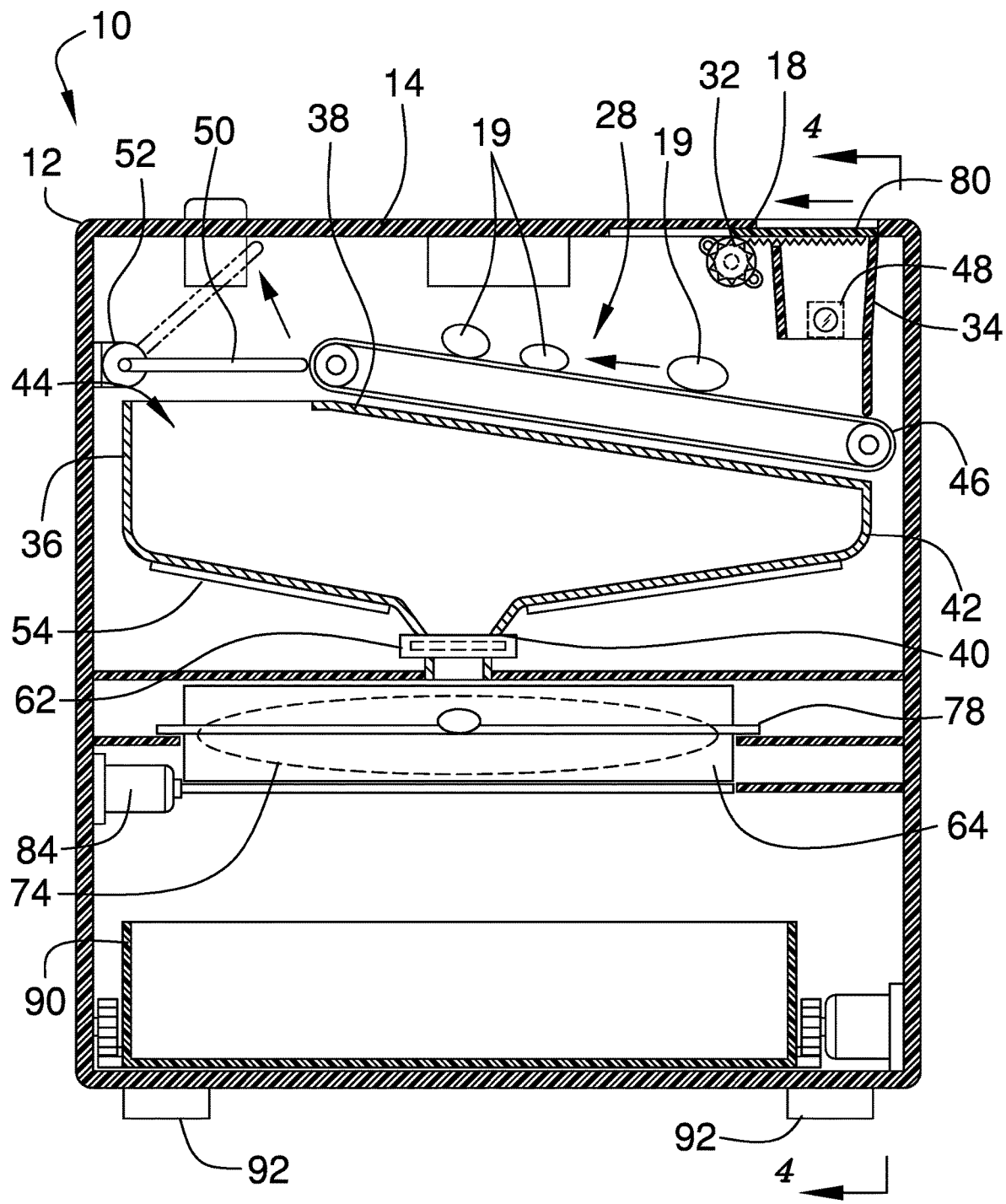
FIG. 3 is a cross sectional view taken along line 3-3 of FIG. 1 of an embodiment of the disclosure.
Figure 4:
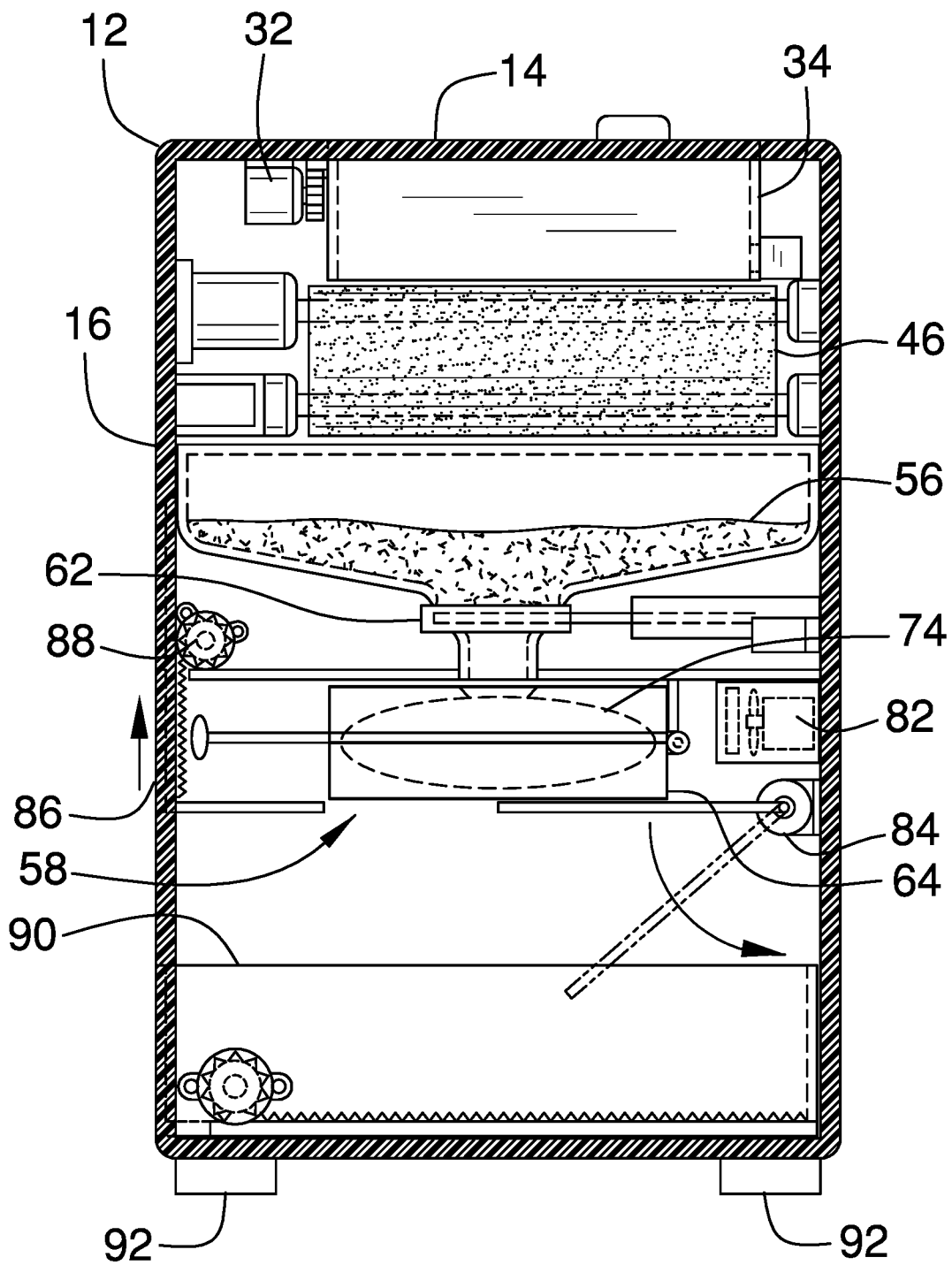
FIG. 4 is a cross sectional view taken along line 4-4 of FIG. 3 of an embodiment of the disclosure showing an opener moving into an opening position.
Figure 5:
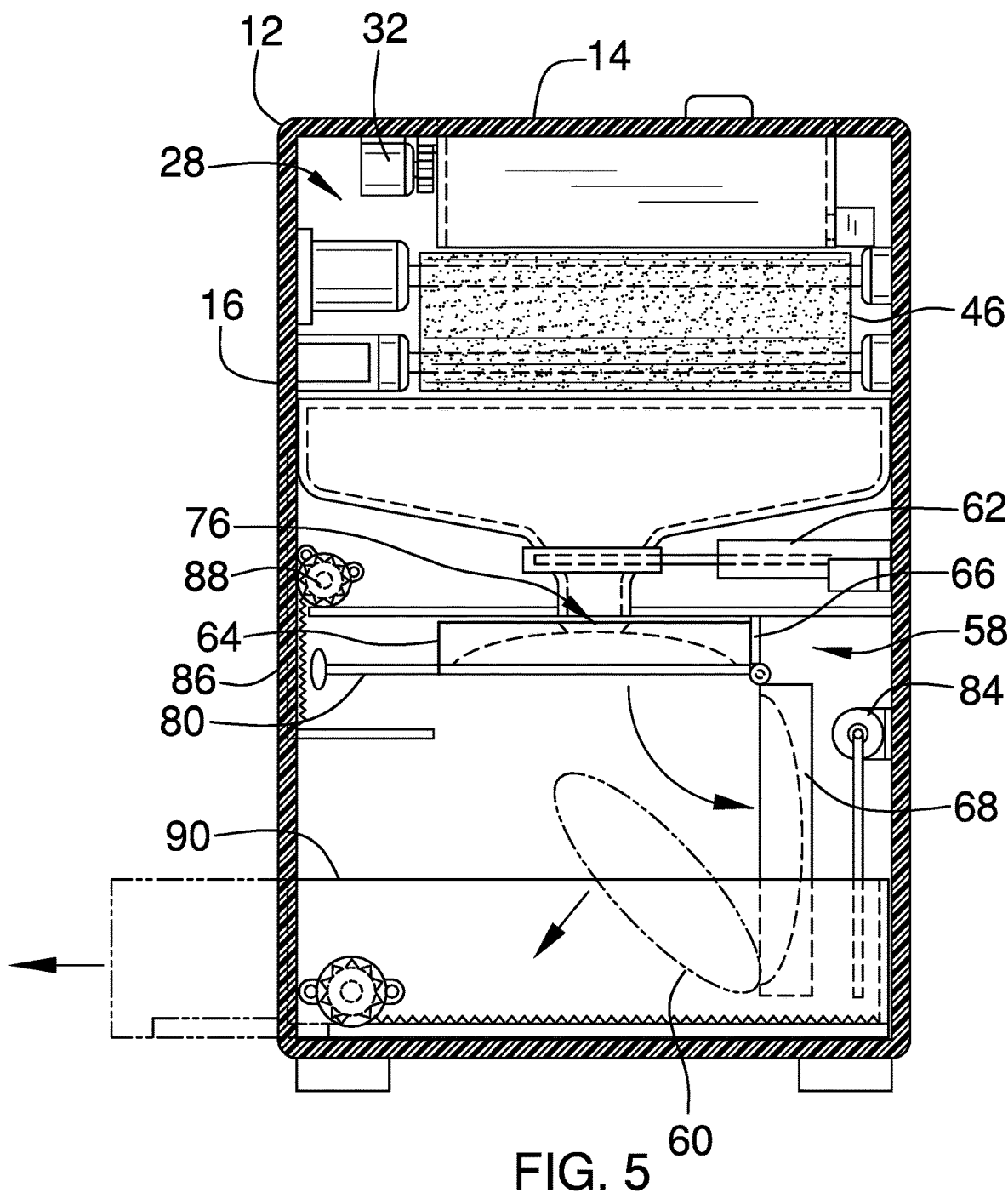
FIG. 5 is a cross sectional view taken along line 4-4 of FIG. 3 of an embodiment of the disclosure showing a form being opened and releasing a bar of soap.
Figure 6:
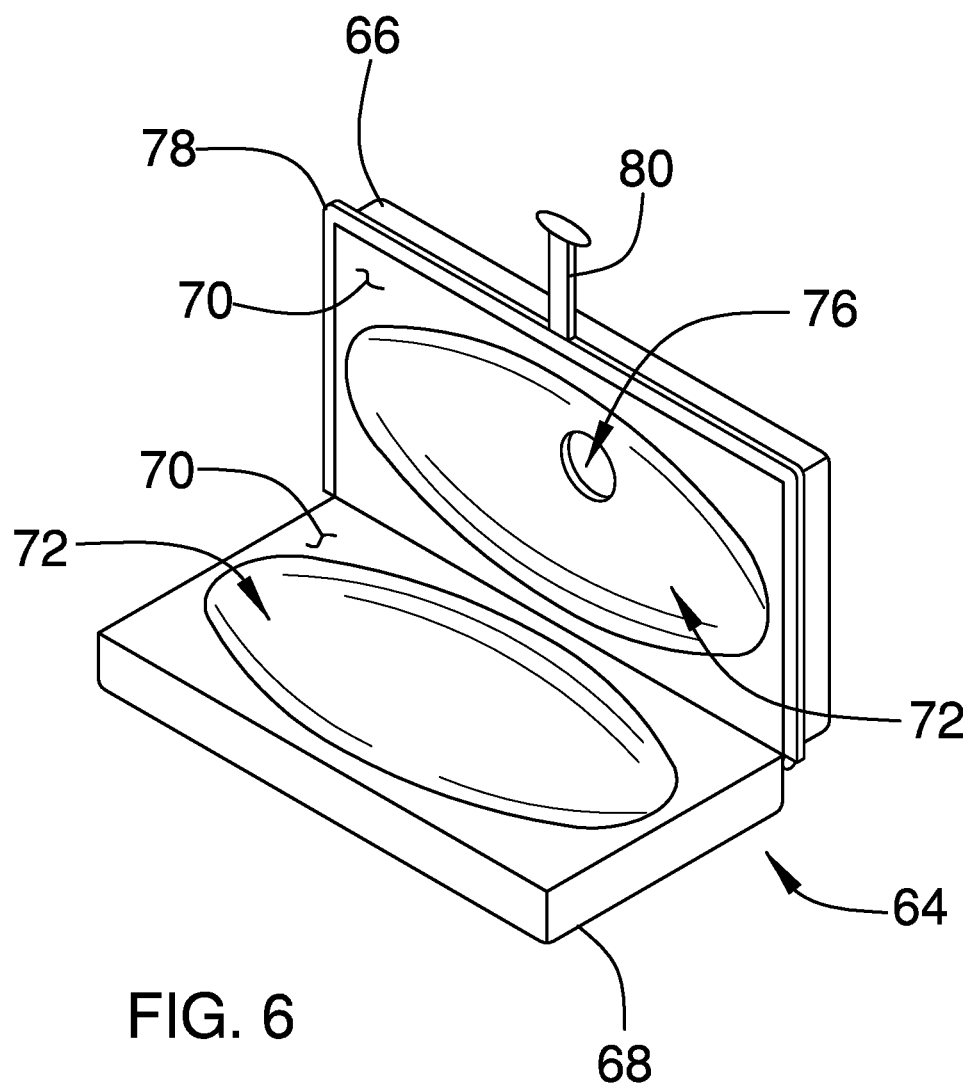
FIG. 6 is a perspective view of a form of an embodiment of the disclosure.
Figure 7:
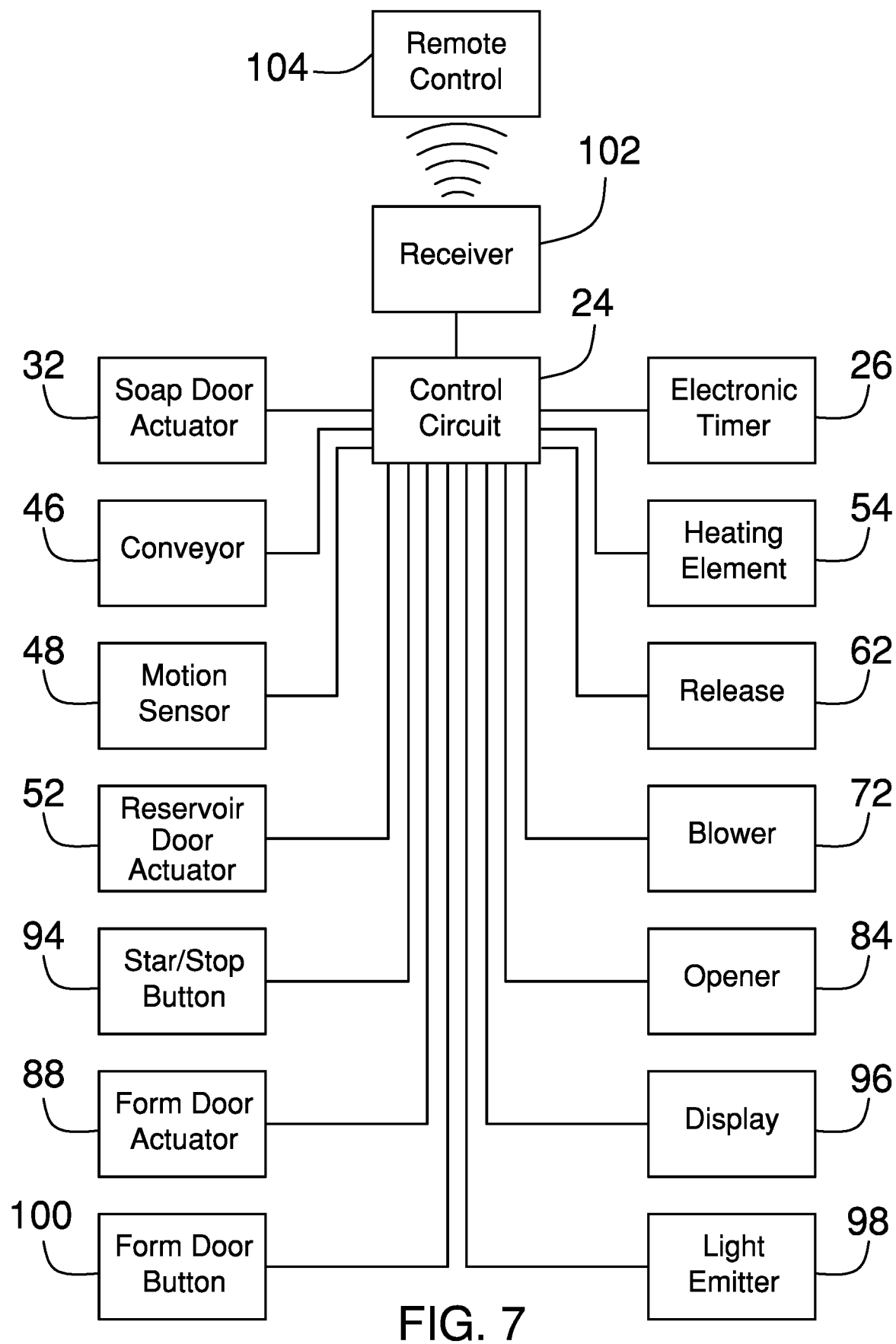
FIG. 7 is a schematic view of an embodiment of the disclosure.

With reference now to the drawings, and in particular to FIGS. 1 through 7 thereof, a new reforming device embodying the principles and concepts of an embodiment of the disclosure and generally designated by the reference numeral 10 will be described.

As best illustrated in FIGS. 1 through 7, the soap reforming assembly 10 generally comprises a housing 12 that has a top wall 14 and a front wall 16. The top wall 14 has an opening 18 extending in an interior of the housing 12 for receiving pieces of soap 19. Additionally, the front wall 16 has a form opening 20 extending into an interior of the housing 12 and the front wall 16 has a drawer opening 22 extending into the interior of the housing 12. A control circuit 24 is coupled to the housing 12 and the control circuit 24 includes an electronic timer 26.

A soap collection unit 28 is provided and the soap collection unit 28 is coupled to the housing 12. The soap collection unit 28 collects and transports pieces of soap 19 when the pieces of soap 19 are dropped into the housing 12. The soap collection unit 28 comprises a soap door 30 that is slidably coupled to the housing 12 and the soap door 30 is aligned with the opening 18 on the top wall 14. The soap door 30 is urged between an open position has the soap door 30 is displaced with the opening 18 and a closed position has the soap door 30 covering the opening 18. A soap door actuator 32 is coupled to the housing 12 and the soap door actuator 32 is electrically coupled to the control circuit 24. The soap door actuator 32 engages the soap door 30 to urge the soap door 30 between the open and closed positions. The soap door actuator 32 may comprise a linear actuator, an electric motor and corresponding gears or any other mechanical means of actuating the soap door 30.

The soap collection unit 28 includes a chute 34 that is positioned in the housing 12 the chute 34 is aligned with the opening 18 in the top wall 14 for receiving the pieces of soap 19. A reservoir 36 is provided and the reservoir 36 is positioned within the housing 12. The reservoir 36 has a top end 38, a bottom end 40 and an outer wall 42 extending therebetween. The bottom end 40 is open and the top end 38 has an entrance 44 extending into an interior of the reservoir 36. Moreover, the outer wall 42 of the reservoir 36 tapers between the top 38 and bottom 40 ends such that the reservoir 36 defines a funnel.

Additionally, the soap collection unit 28 includes a conveyor 46 that is rotatably positioned within the housing 12. The conveyor 46 is positioned between the opening 18 in the top wall 14 of the housing 12 and the top end 38 of the funnel such that the chute 34 directs the pieces of soap 19 onto the conveyor 46. The conveyor 46 rolls in a first direction when the conveyor 46 is turned on to transport and subsequently drop the pieces of soap 19 into the reservoir 36. The conveyor 46 may be a motor driven belt conveyor or any other motorized conveyor.

A motion sensor 48 is coupled to the chute 34 for sensing the pieces of soap 19 passing through the chute 34. The motion sensor 48 is electrically coupled to the control circuit 24 and the control circuit 24 receives a transport input when the motion sensor 48 senses motion. The control circuit 24 turns the conveyor 46 on when the control circuit 24 receives the transport input. A reservoir door 50 is pivotally coupled to the housing 12 and is positioned within the housing 12. The reservoir door 50 is positioned above and is aligned with the entrance 44 in the top end 38 of the reservoir 36. Moreover, the reservoir door 50 is positionable between and open position exposing the entrance 44 and a closed position covering the entrance 44.

A reservoir door actuator 52 is coupled to the housing 12 and the reservoir door actuator 52 is electrically coupled to the control circuit 24. The reservoir door actuator 52 is coupled to the reservoir door 50 and the reservoir door actuator 52 urges the reservoir door 50 between the open and closed positions. Additionally, the reservoir door actuator 52 urges the reservoir door 50 into the open position when the control circuit 24 receives the motion input. The reservoir door actuator 52 may include an electric motor and complementary gears, a linear actuator and any other type of electro-mechanical actuator.

A heating element 54 is coupled to the housing 12 and the heating element 54 is in thermal communication with the soap collection unit 28. The heating element 54 heats the soap collection unit 28 when the heating element 54 is turned on for melting the pieces of soap 19 into a fluid soap 56. The heating element 54 is coupled to the outer wall 42 of the reservoir 36 and the heating element 54 is electrically coupled to the control circuit 24. The heating element 54 is turned on when the control circuit 24 receives the motion input. Moreover, the heating element 54 is turned off when the electronic timer 26 counts down a pre-determined duration of time for melting the soap. The pre-determined duration of time is a duration of time deemed sufficient to render solid pieces of soap 19 into the fluid soap 56.

A forming unit 58 is positioned within the housing 12 and the forming unit 58 is electrically coupled to the control circuit 24. The forming unit 58 receives the fluid soap 56 from the soap collection unit 28 when the heating element 54 produces the fluid soap 56. The forming unit 58 subsequently cools and forms the fluid soap 56 into a bar 60. Thus, the individual pieces of soap 19 are reformed into a single bar 60 for completely using left over pieces of soap 19 for bathing.

The forming unit 58 comprises a release 62 that is slidably coupled to the reservoir 36 and the release 62 is aligned with the bottom end 40 of the reservoir 36. The release 62 is electrically coupled to the control circuit 24. Moreover, the release 62 is turned on into an open position when the electronic timer 26 counts down the pre-determined duration of time. In this way the release 62 facilitates the fluid soap 56 to pour outwardly from the bottom end 40 of the reservoir 36 and into the forming unit 58. Alternatively, the release 62 is turned off into a closed position to retain the fluid soap 56 in the reservoir 36. The release 62 may comprise an electric motor and a panel that slides back and forth across the bottom end 40 of the reservoir 36, a fluid valve or any other type of electro-mechanical release for selectively dispensing a fluid.

The forming unit 58 includes a form 64 that is slidably positioned within the housing 12. The form 64 comprises a first panel 66 that is hingedly coupled to a second panel 68. Each of the first 66 and second 68 panels has a first surface 70 and the first surface 70 on each of the first 66 and second 68 panels has a depression 72 thereon. The depression 72 on each of the first 66 and second 68 panels is concavely arcuate with respect to the first surface 70. The first surface 70 on the first panel 66 abuts the first surface 70 of the second panel 68 when the form 64 is closed such that the depression 72 in each of the first 66 and second 68 panels forms an ovoid bar space 74.

The first panel 66 has an aperture 76 extending therethrough and the aperture 76 intersects the depression 72 in the first panel 66. The first panel 66 has a lip 78 extending outwardly from an outside surface of the first panel 66. The form 64 is insertable through the form opening 20 having the lip 78 slidably engaging the housing 12 to retain the form 64 in the housing 12. The form 64 is positioned beneath the release 62 having the aperture 76 being aligned with the release 62. Thus, the aperture 76 passes the fluid soap 56 into the form 64 when the release 62 is opened. The form 64 may include a soap level sensor that is electrically coupled to the control circuit 24. The soap level sensor may sense the level of fluid soap 56 in the form 64 and the release 62 may be turned off into the closed position when the soap level sensor senses that the form 64 has been filled.

A handle 80 is coupled to the form 64 for gripping and urging the form 64 into and out of the housing 12. A blower 82 is positioned within the housing 12 and the blower 82 is electrically coupled to the control circuit 24. The blower 82 is aligned with the form 64 and the blower 82 urges air onto the form 64 when the blower 82 is turned on. Thus, the blower 82 cools the fluid soap 56 in the form 64. Moreover, the blower 82 is turned on when the release 62 is turned on to open the reservoir 36. The blower 82 may comprise an electric fan with a motor and blades or any other type of electro-mechanical blower 82.

An opener 84 is positioned within the housing 12 and the opener 84 is electrically coupled to the control circuit 24. The opener 84 is aligned with the form 64 when the form 64 is positioned in the housing 12. The opener 84 is actuated into a closing position having the opener 84 engaging the second panel 68 of the form 64 to urge the second panel 68 to abut the first panel 66 of the form 64. Additionally, the opener 84 is actuated into an opening 18 position having the opener 84 disengaging the second panel 68 when the electronic timer 26 counts down a predetermined amount of time for cooling the soap. Thus, the second panel 68 hinges downwardly from the first panel 66 to release the bar 60 of soap downwardly therefrom. The opener 84 may comprise an electric motor and a rod that is pivotally coupled to the electric motor, a linear actuator and any other type of electro-mechanical actuator that can open and close the form 64.

A form door 86 is slidably coupled to the housing 12 and the form door 86 is aligned with the form opening 20. The form door 86 is positionable between an open position and a closed position thereby facilitating the form 64 to be removed from the housing 12 and inserted into the housing 12. A form door actuator 88 is coupled to the housing 12 and the form door actuator 88 engages the form door 86. The form door actuator 88 is electrically coupled to the control circuit 24 and the form door actuator 88 urges the form door 86 between an open position and a closed position. The form door actuator 88 may comprise an electric motor and a complementary set of gears, a linear actuator or any other type of electro-mechanical actuator.

A drawer 90 is slidably positioned in the housing 12 and the drawer 90 receives the bar 60 of soap from the forming unit 58. The drawer 90 is positionable in an open position having the drawer 90 extending outwardly from the housing 12 to dispense the bar 60 of soap. The drawer 90 is positioned beneath the form 64 such that the bar 60 of soap drops into the drawer 90 when the opener 84 is actuated into the opening 18 position. A drawer 90 actuator is coupled to the housing 12, the drawer 90 actuator engages the drawer 90 and the drawer 90 actuator is electrically coupled to the control circuit 24. The drawer 90 actuator urges the drawer 90 between an open position and a closed position. The drawer 90 actuator urges the drawer 90 into the open position when the opener 84 is disengages the form 64.

A plurality of feet 92 is each coupled to a bottom wall of the housing 12. Each of the feet 92 abut a support surface, such as a table top or the like, for supporting the housing 12 above the support surface. A start/stop button 94 is movably coupled to the top wall 14 of the housing 12 and the start/stop button 94 is electrically coupled to the control circuit 24 for turning the control circuit 24 on and off. A display 96 is coupled to the housing 12 and the display 96 is electrically coupled to the control circuit 24. The display 96 displays indicia and the indicia comprise numbers indicating a number of soap bars 60 that have been formed. The display 96 may be an LED display or the like.

A light emitter 98 is coupled to the housing 12 and the light emitter 98 is electrically coupled to the control circuit 24. The light emitter 98 is turned on when the control circuit 24 is turned on for indicating that the control circuit 24 is active. A form door button 100 is movably coupled to the housing 12 and the form door button 100 is electrically coupled to the control circuit 24. The form door actuator 88 urges the form door 86 into the open position when the form door button 100 is manipulated. The form door actuator 88 may comprise an electric motor and complementary gears, a linear actuator or any other type of electro-mechanical actuator.

A receiver 102 is coupled to the housing 12 and the receiver 102 is electrically coupled to the control circuit 24. The receiver 102 may be a radio frequency receiver or the like. A remote control 104 is provided that can be manipulated by a user. The remote control 104 is in wireless electrical communication with the receiver 102 for controlling operational parameters of the control circuit 24. The remote control 104 may be an electronic remote control 104 that includes control buttons, a power supply and a transmitter. A power cord 106 is coupled to and extends away from the housing 12 and the power cord 106 is electrically coupled to the control circuit 24. The power cord 106 has a distal end 108 with respect to the housing 12, a plug 110 is electrically coupled to the distal end 108 and the plug 110 is electrically coupled to a power source 112 such as a female electrical outlet.

In use, the start/stop button 94 is manipulated and the soap door 30 is opened thereby facilitating the pieces of soap 19 to be dropped through the chute 34 and into the reservoir 36. The motion sensor 48 detects the pieces of soap 19 as they fall through the chute 34, the control circuit 24 receives the motion input and subsequently turns the heating element 54 on. Thus, the heating element 54 heats the reservoir 36 for melting the pieces of soap 19 into the fluid soap 56. The release 62 is turned on when the electronic timer 26 counts down a pre-determined duration of time for melting the piece of soap thereby facilitating the fluid soap 56 to pour into the form 64. The blower 82 is turned on when the release 62 is turned on for cooling the fluid soap 56 in the form 64 into the solid bar 60 of soap.

The opener 84 is actuated into the opening 18 position when the electronic timer 26 counts down the pre-determined duration of time for cooling the fluid soap 56. Thus, the resulting bar 60 of soap drops out of the form 64 and into the drawer 90 for subsequent use for bathing or the like. The drawer 90 actuator is turned on when the bar 60 of soap is dropped into the drawer 90 thereby facilitating the bar 60 of soap to be removed from the drawer 90. The control circuit 24 tracks the number of times that the opener 84 is actuated into the opening 18 position thereby facilitating the display 96 to display 96 the number of bar 60s of soap that have been formed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A soap reforming assembly being configured to melt a plurality of soap pieces and subsequently form a bar of soap, said assembly comprising:

a housing having a top wall and a front wall, said top wall having an opening extending in an interior of said housing for receiving pieces of soap, said front wall having a form opening extending into an interior of said housing, said front wall having a drawer opening extending into said interior of said housing;

a control circuit being coupled to said housing, said control circuit including an electronic timer;

a soap collection unit being coupled to said housing, said soap collection unit configured for collecting and transporting pieces of soap when the pieces of soap are dropped into said housing via said opening;

a heating element being coupled to said housing, said heating element being in thermal communication with said soap collection unit, said heating element configured for heating said soap collection unit when said heating element is turned on wherein said soap collection unit is configured to melt the soap pieces into a fluid soap when said heating element heats said soap collection unit;

a forming unit being positioned within said housing, said forming unit being electrically coupled to said control circuit, said forming unit arranged for receiving the fluid soap from said soap collection unit, said forming unit configured for cooling and forming the fluid soap into the bar of soap for bathing;

an opener being positioned within said housing, said opener being electrically coupled to said control circuit, said opener is configured to close the forming unit when the forming unit is cooling and forming the fluid soap, said opener is configured to open the forming unit after the forming unit forms the bar of soap, wherein said control circuit is configured to actuate the opener; and a drawer being slidably positioned in said housing via said drawer opening, said drawer arranged for receiving the bar of soap from said forming unit when said opener opens said forming unit, wherein said drawer is configured to dispense the bar of soap when the drawer is moved to an open position, the open position having said drawer extending outwardly from said housing.

2. The assembly according to claim 1, wherein said soap collection unit comprises:

a soap door being slidably coupled to said housing, said soap door being aligned with said opening on said top wall, said soap door being urged between an open position having said soap door being displaced with said opening and a closed position having said soap door covering said opening; and a soap door actuator being coupled to said housing, said soap door actuator being electrically coupled to said control circuit, said soap door actuator engaging said soap door, said soap door actuator urging said soap door between said open and closed positions.

3. The assembly according to claim 2, wherein said soap collection unit further comprises:

a chute being positioned in said housing, said chute being aligned with said opening in said top wall for receiving the soap pieces; and a reservoir being positioned within said housing, said reservoir having a top end, a bottom end and an outer wall extending therebetween, said bottom end being open, said top end having an entrance extending into an interior of said reservoir, said outer wall of said reservoir tapering between said top and bottom ends such that said reservoir defines a funnel.

4. The assembly according to claim 3, wherein said soap collection unit further comprises:

a conveyor being rotatably positioned within said housing, said conveyor being positioned between said opening in said top wall of said housing and said top end of said funnel such that said chute directs the soap pieces onto the conveyor, said conveyor rolling in a first direction when said conveyor is turned on to transport and subsequently drop the soap pieces into said reservoir; and a motion sensor being coupled to said chute for sensing the soap pieces passing through said chute, said motion sensor being electrically coupled to said control circuit, said control circuit receiving a transport input when said motion sensor senses motion, said control circuit turning said conveyor on when said control circuit receives said transport input.

5. The assembly according to claim 3, wherein said soap collection unit further comprises:

a reservoir door being pivotally coupled to said housing and being positioned within said housing, said reservoir door being positioned above and being aligned with said entrance in said top end of said reservoir, said reservoir door being positionable between an open position exposing said entrance and a closed position covering said entrance; and a reservoir door actuator being coupled to said housing, said reservoir door actuator being electrically coupled to said control circuit, said reservoir door actuator being coupled to said reservoir door, said reservoir door actuator urging said reservoir door between said open and closed positions, said reservoir door actuator urging said reservoir door into said open position when said control circuit receives said transport input.

6. The assembly according to claim 4, wherein said heating element is coupled to said outer wall of said reservoir, said heating element being electrically coupled to said control circuit, said heating element being turned on when said control circuit receives said transport input, said heating element being turned off when said electronic timer counts down a pre-determined duration of time for melting the soap pieces.

7. The assembly according to claim 6, wherein said forming unit comprises a release being slidably coupled to said reservoir, said release being aligned with said bottom end of said reservoir, said release being electrically coupled to said control circuit, said release being turned on into an open position when said electronic timer counts down said pre-determined duration of time, wherein said release is configured to facilitate the fluid soap to pour outwardly from said bottom end of said reservoir when said release is turned on into the open position, wherein said release is configured to retain the fluid soap in said reservoir when said release is turned off into a closed position.

8. The assembly according to claim 7, wherein said forming unit further comprises:

a form being slidably positioned within said housing, said form comprising a first panel being hingedly coupled to a second panel, each of said first and second panels having a first surface, said first surface on each of said first and second panels having a depression thereon, said depression on each of said first and second panels being concavely arcuate with respect to said first surface;

said first surface on said first panel abutting said first surface of said second panel when said form is closed such that said depression in each of said first and second panels forms an ovoid bar space;

said first panel having an aperture extending therethrough and intersecting said depression in said first panel;

said first panel having a lip extending outwardly from an outside surface of said first panel, said form being insertable through the form opening in said housing, said lip slidably engaging said housing to retain said form in said housing, said form being positioned beneath said release such that said aperture is aligned with said release, wherein said aperture is configured to pass the fluid soap into said form when said release is opened.

9. The assembly according to wherein said forming unit further comprises, further comprising a blower being positioned within said housing, said blower being electrically coupled to said control circuit, said blower being aligned with said form, said blower urging air onto said form when said blower is turned on, wherein the air is configured to cool the fluid soap in said form, and said blower is turned on when said release is turned on to open said reservoir.

10. The assembly according to claim 8, said opener being aligned with said form when said form is positioned in said housing;

said opener being actuated into a closing position having said opener engaging said second panel of said form to urge said second panel to abut said first panel of said form; and said opener being actuated into an opening position having said opener disengaging said second panel when said electronic timer counts down a predetermined amount of time for cooling the fluid soap thereby facilitating said second panel to hinge downwardly from said first panel, wherein said form is configured to release the bar of soap downwardly therefrom when said opener disengages said second panel from said first panel.

11. The assembly according to claim 8, further comprising:

a form door being slidably coupled to said housing, said form door being aligned with said form opening, said form door being positionable between an open position and a closed position;

a form door actuator being coupled to said housing, said form door actuator engaging said form door, said form door actuator being electrically coupled to said control circuit, said form door actuator urging said form door between said open position and said closed position; and a form door button being movably coupled to said housing, said form door button being electrically coupled to said control circuit, said form door actuator urging said form door into said open position when said form door button is manipulated.

12. The assembly according to claim 1, further comprising:
- a start/stop button being movably coupled to said top wall of said housing, said start/stop button being electrically coupled to said control circuit for turning said control circuit on and off;
- a display being coupled to said housing, said display being electrically coupled to said control circuit, said display displaying indicia, said indicia comprising numbers indicating a number of soap bars that have been formed; and
- a light emitter being coupled to said housing, said light emitter being electrically coupled to said control circuit, said light emitter being turned on when said control circuit is turned on for indicating that said control circuit is active.

13. The assembly according to claim 1, further comprising:
- a receiver being coupled to said housing, said receiver being electrically coupled to said control circuit; and
- a remote control being manipulated by a user, said remote control being in wireless electrical communication with said receiver for controlling operational parameters of said control circuit.

14. The assembly according to claim 1, further comprising a power cord being coupled to and extending away from said housing, said power cord being electrically coupled to said control circuit, said power cord having a distal end with respect to said housing, said distal end having a plug being electrically coupled thereto, said plug being electrically coupled to a power source.

15. A soap reforming assembly being configured to melt a plurality of soap pieces and subsequently form a bar of soap, said assembly comprising:
- a housing having a top wall and a front wall, said top wall having an opening extending in an interior of said housing for receiving pieces of soap, said front wall having a form opening extending into an interior of said housing, said front wall having a drawer opening extending into said interior of said housing;
- a control circuit being coupled to said housing, said control circuit including an electronic timer;
- a soap collection unit being coupled to said housing, said soap collection unit configured for collecting and transporting pieces of soap when the pieces of soap are dropped into said housing via said opening, said soap collection unit comprising:
  - a soap door being slidably coupled to said housing, said soap door being aligned with said opening on said top wall, said soap door being urged between an open position having said soap door being displaced with said opening and a closed position having said soap door covering said opening;
  - a soap door actuator being coupled to said housing, said soap door actuator being electrically coupled to said control circuit, said soap door actuator engaging said soap door, said soap door actuator urging said soap door between said open and closed positions;
  - a chute being positioned in said housing, said chute being aligned with said opening in said top wall for receiving the soap pieces;
  - a reservoir being positioned within said housing, said reservoir having a top end, a bottom end and an outer wall extending therebetween, said bottom end being open, said top end having an entrance extending into an interior of said reservoir, said outer wall of said reservoir tapering between said top and bottom ends such that said reservoir defines a funnel;
  - a conveyor being rotatably positioned within said housing, said conveyor being positioned between said opening in said top wall of said housing and said top end of said funnel such that said chute directs the soap pieces onto the conveyor, said conveyor rolling in a first direction when said conveyor is turned on to transport and subsequently drop the soap pieces into said reservoir;
  - a motion sensor being coupled to said chute for sensing the soap pieces passing through said chute, said motion sensor being electrically coupled to said control circuit, said control circuit receiving a transport input when said motion sensor senses motion, said control circuit turning said conveyor on when said control circuit receives said transport input;
  - a reservoir door being pivotally coupled to said housing and being positioned within said housing, said reservoir door being positioned above and being aligned with said entrance in said top end of said reservoir, said reservoir door being positionable between an open position exposing said entrance and a closed position covering said entrance; and
  - a reservoir door actuator being coupled to said housing, said reservoir door actuator being electrically coupled to said control circuit, said reservoir door actuator being coupled to said reservoir door, said reservoir door actuator urging said reservoir door between said open and closed positions, said reservoir door actuator urging said reservoir door into said open position when said control circuit receives said transport input;
- a heating element being coupled to said housing, said heating element being in thermal communication with said soap collection unit, said heating element configured for heating said soap collection unit when said heating element is turned on, wherein said soap collection unit is configured to melt the soap pieces into a fluid soap when said heating element heats said soap collection unit, said heating element being coupled to said outer wall of said reservoir, said heating element being electrically coupled to said control circuit, said heating element being turned on when said control circuit receives said transport input, said heating element being turned off when said electronic timer counts down a pre-determined duration of time for melting the soap pieces;
- a forming unit being positioned within said housing, said forming unit being electrically coupled to said control circuit, said forming unit arranged for receiving the fluid soap from said soap collection unit, said forming unit configured for cooling and forming the fluid soap into the bar of soap for bathing, said forming unit comprising:
  - a release being slidably coupled to said reservoir, said release being aligned with said bottom end of said reservoir, said release being electrically coupled to said control circuit, said release being turned on into an open position when said electronic timer counts down said pre-determined duration of time, wherein said release is configured to facilitate the fluid soap to pour outwardly from said bottom end of said reservoir when said release is turned on into the open position, wherein said release is configured to retain the fluid soap in said reservoir when said release is turned off into a closed position;

a form being slidably positioned within said housing, said form comprising a first panel being hingedly coupled to a second panel, each of said first and second panels having a first surface, said first surface on each of said first and second panels having a depression thereon, said depression on each of said first and second panels being concavely arcuate with respect to said first surface, said first surface on said first panel abutting said first surface of said second panel when said form is closed such that said depression in each of said first and second panels forms an ovoid bar space, said first panel having an aperture extending therethrough and intersecting said depression in said first panel, said first panel having a lip extending outwardly from an outside surface of said first panel, said form being insertable through said form opening, said lip slidably engaging said housing to retain said form in said housing, said form being positioned beneath said release such that said aperture is aligned with said release, wherein said aperture is configured to pass the fluid soap into said form when said release is opened;

a handle being coupled to said form for gripping and urging said form into and out of said housing;

a blower being positioned within said housing, said blower being electrically coupled to said control circuit, said blower being aligned with said form, said blower urging air onto said form when said blower is turned on, wherein said air is configured to cool the fluid soap in said form, said blower being turned on when said release is turned on to open said reservoir;

an opener being positioned within said housing, said opener being electrically coupled to said control circuit, said opener being aligned with said form when said form is positioned in said housing, said opener being actuated into a closing position having said opener engaging said second panel of said form to urge said second panel to abut said first panel of said form, said opener being actuated into an opening position having said opener disengaging said second panel when said electronic timer counts down a predetermined amount of time for cooling the soap fluid thereby facilitating said second panel to hinge downwardly from said first panel, wherein said form is configured to release the bar of soap downwardly therefrom when said opener disengages said second panel from said first panel;

a form door being slidably coupled to said housing, said form door being aligned with said form opening, said form door being positionable between an open position and a closed position; and a form door actuator being coupled to said housing, said form door actuator engaging said form door, said form door actuator being electrically coupled to said control circuit, said form door actuator urging said form door between the open position and the closed position;

a drawer being slidably positioned in said housing via said drawer opening, said drawer arranged for receiving the bar of soap from said form when said form releases the bar of soap downwardly therefrom, said drawer being positioned beneath said form, wherein said drawer is configured to dispense the bar of soap when the drawer is moved to an open position, the open position having said drawer extending outwardly from said housing;

a drawer actuator being coupled to said housing, said drawer actuator engaging said drawer, said drawer actuator being electrically coupled to said control circuit, said drawer actuator moving said drawer between said open position and a closed position, said drawer actuator moving said drawer into said open position after said opener disengages said first and second panels of said form;

a plurality of feet, each of said feet being coupled to a bottom wall of said housing, each of said feet abutting a support surface for supporting said housing above the support surface;

a start/stop button being movably coupled to said top wall of said housing, said start/stop button being electrically coupled to said control circuit for turning said control circuit on and off;

a display being coupled to said housing, said display being electrically coupled to said control circuit, said display displaying indicia, said indicia comprising numbers indicating a number of soap bars that have been formed;

a light emitter being coupled to said housing, said light emitter being electrically coupled to said control circuit, said light emitter being turned on when said control circuit is turned on for indicating that said control circuit is active;

a form door button being movably coupled to said housing, said form door button being electrically coupled to said control circuit, said form door actuator urging said form door into said open position when said form door button is manipulated;

a receiver being coupled to said housing, said receiver being electrically coupled to said control circuit;

a remote control being manipulated by a user, said remote control being in wireless electrical communication with said receiver for controlling operational parameters of said control circuit; and a power cord being coupled to and extending away from said housing, said power cord being electrically coupled to said control circuit, said power cord having a distal end with respect to said housing, said distal end having a plug being electrically coupled thereto, said plug being electrically coupled to a power source.

* * * * *